United States Patent [19]

Quisquater et al.

[11] Patent Number: 5,351,300
[45] Date of Patent: Sep. 27, 1994

[54] METHOD OF MODIFYING PSEUDO-RANDOM SEQUENCES AND DEVICE FOR SCRAMBLING OR DESCRAMBLING INFORMATION COMPONENTS

[75] Inventors: Jean-Jacques Quisquater, Rhode-St-Genese, Belgium; Issa Rakhodai, Montigny le Bretonneux, France

[73] Assignee: U.S. Philips Corporation, New York, N.Y.

[21] Appl. No.: 87,647

[22] Filed: Jul. 6, 1993

[30] Foreign Application Priority Data

Jul. 29, 1992 [FR] France ................ 92 09400

[51] Int. Cl.⁵ ............................................ H04L 9/00
[52] U.S. Cl. ................................ 380/46; 380/49; 380/50; 364/717
[58] Field of Search .................. 380/46, 49, 50; 364/717

[56] References Cited

U.S. PATENT DOCUMENTS 4,023,026  5/1977  O'Farrell ........................ 364/717
4,785,410 11/1988  Hamatsu et al. ................ 364/717
4,845,654  7/1989  Harada et al. .................. 364/717
4,864,525  9/1989  Kurihara et al. ................ 364/717
5,079,733  1/1992  Antoine et al. .

OTHER PUBLICATIONS

"Specification of the D2-MAC/packet System", 1985, pp. 141-166.

*Primary Examiner*—David C. Cain
*Attorney, Agent, or Firm*—Michael E. Marion

[57] ABSTRACT

For dynamically modifying pseudo-random sequences of a pseudo-random sequence generator which is re-initialized at each start of the packet of information components, the information component itself is derived, delayed and combined with one of the series of bits present in the pseudo-random sequence generator. After having delayed the derived information component by a given delay (20), the component is modified by passing it through an EXCLUSIVE-OR gate (23) and by delaying the output signal of said gate with a delay (21) equal to that (20) used for said derived information component, and by feeding it back to the input of the gate.

9 Claims, 3 Drawing Sheets

METHOD OF MODIFYING PSEUDO-RANDOM SEQUENCES AND DEVICE FOR SCRAMBLING OR DESCRAMBLING INFORMATION COMPONENTS

BACKGROUND OF THE INVENTION

The invention relates to a method of dynamically modifying a pseudo-random sequence produced by a pseudo-random sequence generator, which sequence is used for scrambling or descrambling information components at least one part of which is provided in the form of a digital signal divided into packets, the scrambling or descrambling being obtained by combining said pseudo-random sequence with said digital signal, said pseudo-random sequence generator being re-initialized at each start of the packet by means of an initialization word.

The invention also relates to a device for scrambling or descrambling information components at least one part of which is transmitted in the form of a digital signal divided into packets, which device comprises a pseudo-random sequence generator which is re-initialized at each start of the packet, a first non-recursive combination means for forming a pseudo-random sequence on the basis of a series of bits present in the pseudo-random sequence generator, a second combination means for combining the pseudo-random sequence with the digital signal to be scrambled or descrambled.

Such a method and a device are particularly used in television transmissions whose reception is reserved, for example to persons who have paid a subscription fee or who comply with particular criteria (transmissions reserved for certain professions).

Numerous methods and devices corresponding to those described above are known. One of these is, for example the standard system defined in the document "Specification of the D2-MAC/packet system", 1985, pp. 141 to 166. The device comprises a pseudo-random sequence generator which uses an initialization word formed at the receiver end by combining a control word which is determined from a plurality transmitted by a transmitter, a current image field number and a magnitude which is representative of the position of the data packet in the field. The pseudo-random sequence generator has two shift registers. Each of them is fed back to itself and a series of bits is derived therefrom so as to be one of the elements used for forming one of said pseudo-random sequences. At the start of each packet the shift registers are re-initialized, i.e. charged by the initialization word. The plurality transmitted by the transmitter is changed every ten seconds. Due to the fact that the number of the current image field and the position of the data packet in the field influence the construction of the initialization word, this word changes approximately two thousand times per second.

One is currently interested in digital television systems in which neither the fields nor the packets are enumerated. When a known scrambling method is used in these systems, for example the method in accordance with the D2-MAC standard, a fraudulent search of the initialization word will be very easy because it changes only every ten seconds and no longer two thousand times per second, while in ten seconds the fraud has the disposal of many samples all of which are generated with the same pseudo-random sequence for effecting a search and discovering the pseudo-random sequences used for scrambling.

An essential criterion in such a system is the impossibility of fraudulently retrieving the initialization word. This impossibility is relative, which means that this cannot be done within a sufficiently short time for the method in question to be valuable in practice. To this end it is possible to diversify the pseudo-random sequence by influencing the message itself in the creation of the sequence.

However, such a procedure involves the risk of error propagation, i.e. in the case of a transmission error in the transmission channel an error is multiplied by carrying out the descrambling operation at the receiver end.

It is an object of the invention to solve this problem.

SUMMARY OF THE INVENTION

According to the invention, said digital signal is derived, delayed and combined with a series of bits present in the pseudo-random sequence generator for modifying said series of bits and the derived digital signal is modified by submitting it to a logic operation of the "EXCLUSIVE-OR" type before it is combined with a series of bits present in the pseudo-random sequence generator, one of the operands being the signal itself and the other operand being the signal which emanates from said operation and is delayed by a time which is equal to the shift between the instant when the digital signal is derived and the instant when its combination with a series of bits present in the pseudo-random sequence generator has a retroactive effect on the digital signal.

The task of retrieving the initialization word is thus made much more complicated, while the propagation of errors is limited.

In accordance with a particular embodiment of the invention, the combination of the delayed signal with the series of bits present in the pseudo-random sequence generator is started for each new packet only after a certain delay since the start of the packet.

The fraudulent retrieval of the initialization word will thus be even more difficult.

For modifying the pseudo-random sequence the device according to the invention comprises a delay circuit whose input is connected to a connection conveying the digital signal and whose output is connected to said first combination means of the pseudo-random generator in such a way that it modifies said series of bits, and an "EXCLUSIVE-OR" gate which is arranged in the delay circuit between said connection conveying the digital signal and said first combination means, and whose output is fed back to its input via a delay means having a delay which is equal to the shift between the instant when the digital signal is derived and the instant when its combination with a series of bits present in the pseudo-random sequence generator has a retroactive effect on the digital signal.

The task of retrieving the initialization word is thus made much more complicated, while the propagation of errors is limited.

In accordance with an advantageous embodiment the EXCLUSIVE-OR gate has at least a first and a second input, the first input of said EXCLUSIVE-OR gate being connected to the digital signal connection, the output being connected to the second input via a delay circuit and an intermediate terminal in the delay circuit being connected to the first combination means of the pseudo-random generator, the delay between said terminal and the second input of the gate being equal to the transit time in the pseudo-random sequence generator, i.e. the time necessary for the signal from said terminal to the first combination means of the pseudo-random generator to have a retroactive effect on the digital signal.

BRIEF DESCRIPTION OF THE DRAWING

These and other aspects of the invention will be apparent from and elucidated with reference to the embodiments described hereinafter. In the drawings

DETAILED DESCRIPTION OF THE PREFERRED EMBODIMENTS

Figure 1:
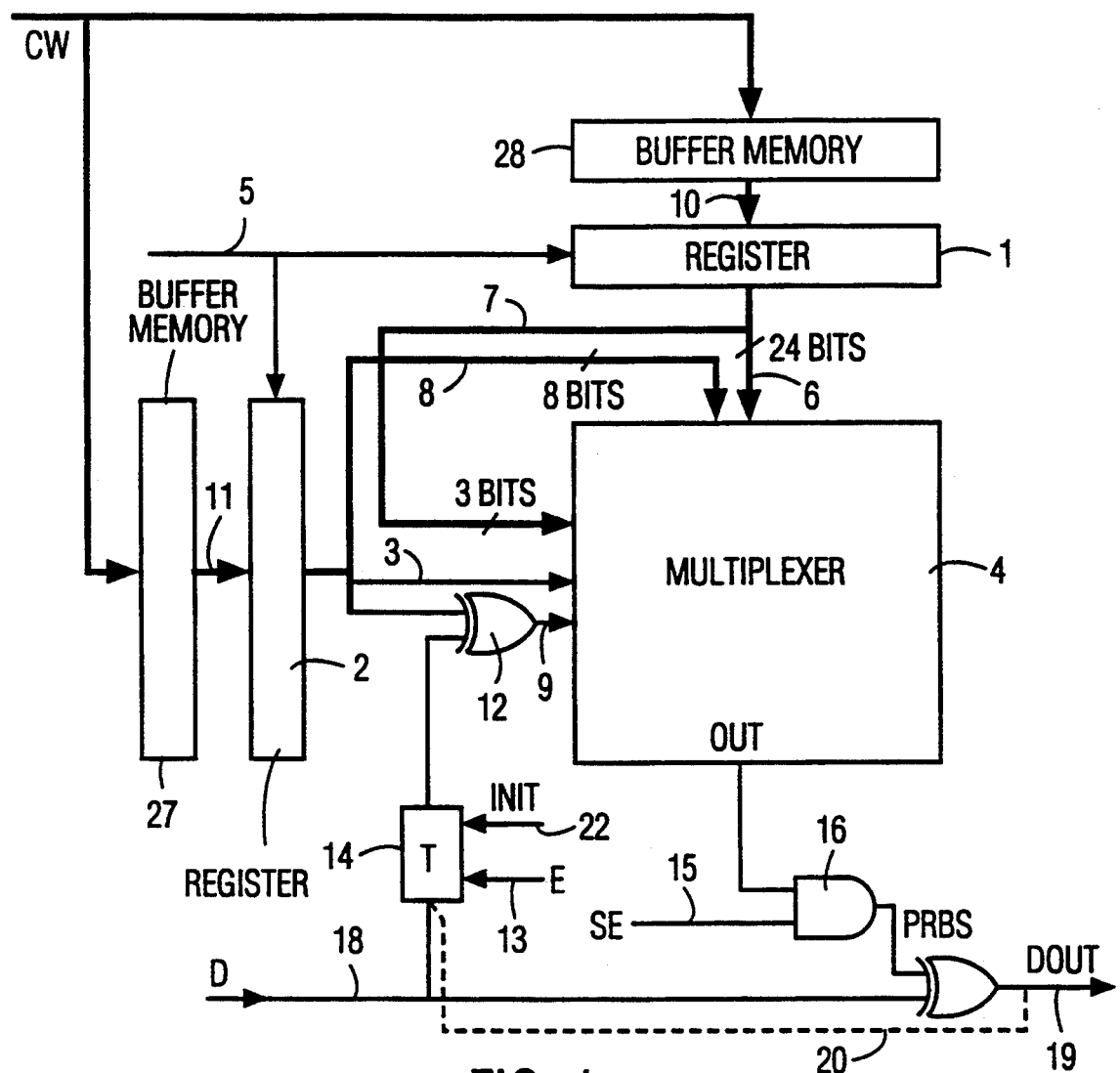
FIG. 1 shows diagrammatically a scrambling or descrambling device for which the invention can be used.

The device whose diagram is shown in FIG. 1 is intended to scramble television signals at the transmitter end and, with a minor modification, it may also be used for descrambling signals at the receiver end. In the case of a digital television standard, at a normal definition or at a high definition, the information components are transmitted in the form of a digital signal divided into packets.

The device comprises a pseudo-random sequence generator having a first shift register 1 (of 31 bits) and a second shift register 2 (of 29 bits). Each of these registers is fed back to itself in known manner for functionally representing a first polynomial and its contents are advanced one position at each peak of a clock signal which is supplied through a connection 5. The registers are re-initialized at the start of each data packet, i.e. charged by means of an initialization word supplied through a connection "cw" and memorized in buffer memories 27 and 28. This word comprises 60 bits: 31 of them are used for charging the register 1 via the connection 10 and the 29 others are used for charging the register 2 via the connection 11. 24 Bits are derived from the first register via the connection 6 and eight bits are derived from the second register via the connection 8, which results in 32 bits. These bits are applied to a multiplexer 4 which constitutes a first non-recursive combination means intended to form a pseudo-random sequence based on a series of bits present in the pseudo-random sequence generator and which also receives three other bits from the register 1 via the connection 7 and two other bits from the register 2 via the connections 3 and 9. These five bits represent a number ranging between 0 and 31, which number defines a bit among the 32 bits present at the connections 6 and 8. The bit from the multiplexer 4 is applied to an input of a gate 16, another input of which receives a signal 15 (SE="Scrambling Enable") which opens or closes the gate 16 dependent on whether a scrambling operation is carried out or not carried out. If the gate 16 is open, the bit from this gate will finally reach a first input of a gate 17 of, for example the EXCLUSIVE-OR type which constitutes a second combination means and the digital signal D to be scrambled is applied via the point 18 to a second input of the gate 17 so that a scrambled digital signal is applied to the output 19 of the gate.

Series of bits are thus derived in the shift registers 1 and 2 for forming a pseudo-random sequence constituted by successive bits supplied at 25 of the multiplexer 4, which sequence is combined with the digital signal to be scrambled. This circuit, as described so far, can also be used without any changes for scrambling a clear signal D or for descrambling a scrambled signal D.

To make it more difficult for an unauthorized person to find the initialization word, the digital signal D is derived in the case of scrambling at the level of the junction point 18, i.e. at a point where the digital signal is not yet scrambled and this digital signal is delayed by means of a delay element 14 which is in practice a shift register which is not fed back and has a delay T, the input of said element being connected to the connection 18 conveying the digital signal and the output being connected to the multiplexer 4 via a circuit 12 which combines the delayed signal with a series of bits from the shift register 2. An input 13 (E="Enable") provides the possibility of activating or inhibiting the element 14 and an input 22 is provided for controlling the charge of zeros in the register 14 at the start of the packet.

Instead of using a gate such as the gate 12 described hereinbefore, the combination with the series of bits of the register may also be performed in other manners: each bit of the connection reaching point 9 (or one of the connections 3 or 7) may also be changed by multiplying it by a bit of the delayed signal instead of by adding this bit, while it is also possible to replace it by a bit of the delayed signal. The combination may also be based on each bit of the signal from the element 14 for inverting or not inverting the signals between two connections 7, 3 or 9. The combination may also be based on the delayed signal itself or on certain bits of the control word or the initialization word for choosing arbitrarily among several of these methods. It will be evident that there is a very large number of modifications. In all these cases the bit at the output of the element 14 eventually acts on the multiplexer 4.

The signal D is thus dynamically modified to the extent where its modification by the gate 17 depends on the contents of the signal itself.

In the case of a descrambling operation, the diagram of FIG. 1 is suitable, but for one modification: the input of the delay element 14 must be connected to a point where the digital signal is descrambled, i.e. to the output of the gate 17, as is indicated by the broken line 20.

The delay is T clock periods, for example T is between one and ten periods. At a delay of, for example three clock periods, a bit of the rank N of the message acts to remodify the bit of the rank N+3. The bit of the rank N+1 of the message acts to remodify the bit of the rank N+4 and so forth. When it arrives at the bit of the rank N+6, it is modified by the bit of the rank N+3 which itself has been modified by the bit of the rank N: thus, the more one advances in the packet, the more the modification becomes complex and difficult to retrieve.

It is obvious that the method thus carried out complicates the task of retrieving the initialization word by way of successive trials and comparisons because, with the initialization word being changed, for example only every ten seconds and without the elements 12 and 14, one would have the disposal of the same scrambling mechanism during a time which is long enough to carry out numerous trials for retrieving the initialization word, while with the elements 12 and 14 the mechanism is modified at each packet, which limits the time available for searching the initialization word. Nevertheless, this system has a drawback: if a transmission error affects the signal, this error is introduced into the descrambling sequence, whereas it was not present in the corresponding scrambling sequence, and, as a result of the delay T applied to the signal in the element 14, it will thus induce a second error which is shifted by T clock periods and which itself would be re-introduced in the sequence, and so forth: a very large number of errors will thus be introduced.

Figure 2:
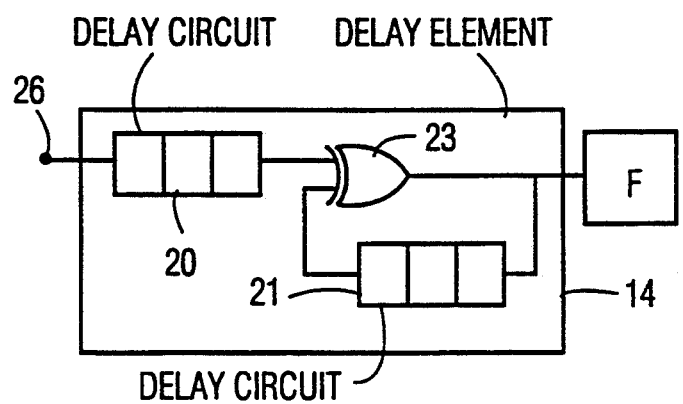
FIG. 2 shows an embodiment of the delay circuit with the EXCLUSIVE-OR gate which is element 14 of the device of FIG. 1.

To remedy this drawback, it has been proposed to modify the delayed signal as is indicated in FIG. 2. The derived signal is delayed by a delay T by means of a delay circuit which is a shift register 20 having T positions whose input 26 is connected either to point 18 (in the case of scrambling) or to point 19 (in the case of descrambling) in the circuit diagram of FIG. 1. This circuit 20 is controlled by the clock of the system and it has three positions in this case, which ensures a delay of three clock periods, as already mentioned by way of example. The signal from the delay circuit is applied to an input of an EXCLUSIVE-OR gate 23 whose output signal is applied to the circuit F, i.e. the circuit 12 in FIG. 1. The output of the gate 23 is also fed back to a second input of the same gate via a second delay circuit 21 which is also a register and brings about a delay which is equal to that by the first delay circuit 20.

The operation is as follows: when the bit of the rank N+3 appears at the output of the element 20, the bit of the rank N successively delayed by the elements 20 and 21 appears at the same instant at the other input of the gate 23 and possibly modifies the state of the output of the gate which in the gate 17 and via the different elements 12, 2, 4, 16 eventually acts on the descrambling of the bit of the rank N+6 of the signal. Let it be assumed that as a result of a transmission error the bit of the rank N is erroneous. The bit of the rank N+3 will be descrambled erroneously because the bit of the rank N itself is erroneous and it will thus be derived with its erroneous value for the purpose of delay, but since it appears at the output of the element 20, the bit N itself also appears at the input of the gate 23 at that instant. The EXCLUSIVE-OR addition of these bits, which are both erroneous, reproduces a correct bit at the output and the error ceases to propagate. This also implies that no delay is brought about in the other elements of the circuit, notably the elements 12, 14 and the multiplexer 4. For each transmission error the system thus introduces a second, but not more. If it is also assumed that the bits N and N+3 are both affected by a transmission error, the erroneous bit N+3 will become correct during the descrambling operation and the situation is better again: the first error has eliminated the second.

At the start of a packet the information contents are sometimes relatively foreseeable. It is thus easier to find the initialization word because one has an idea of the descrambled signal which must be found. It is thus preferable not to scramble the start of the packets so that these packet starts cannot be used for retrieving the initialization word. By means of the control 13 of FIG. 1 it is possible to carry out or not carry out the scrambling or descrambling complement as described above. This control is thus used in such a way that for each new packet it will only be after a certain delay since the start of the packet that the delayed signal and the series of bits present in the pseudo-random sequence generator are being combined with each other. To complicate the process, said delay may itself be determined from the first bits of the packet or from the bits of the initialization word.

Figure 3A:
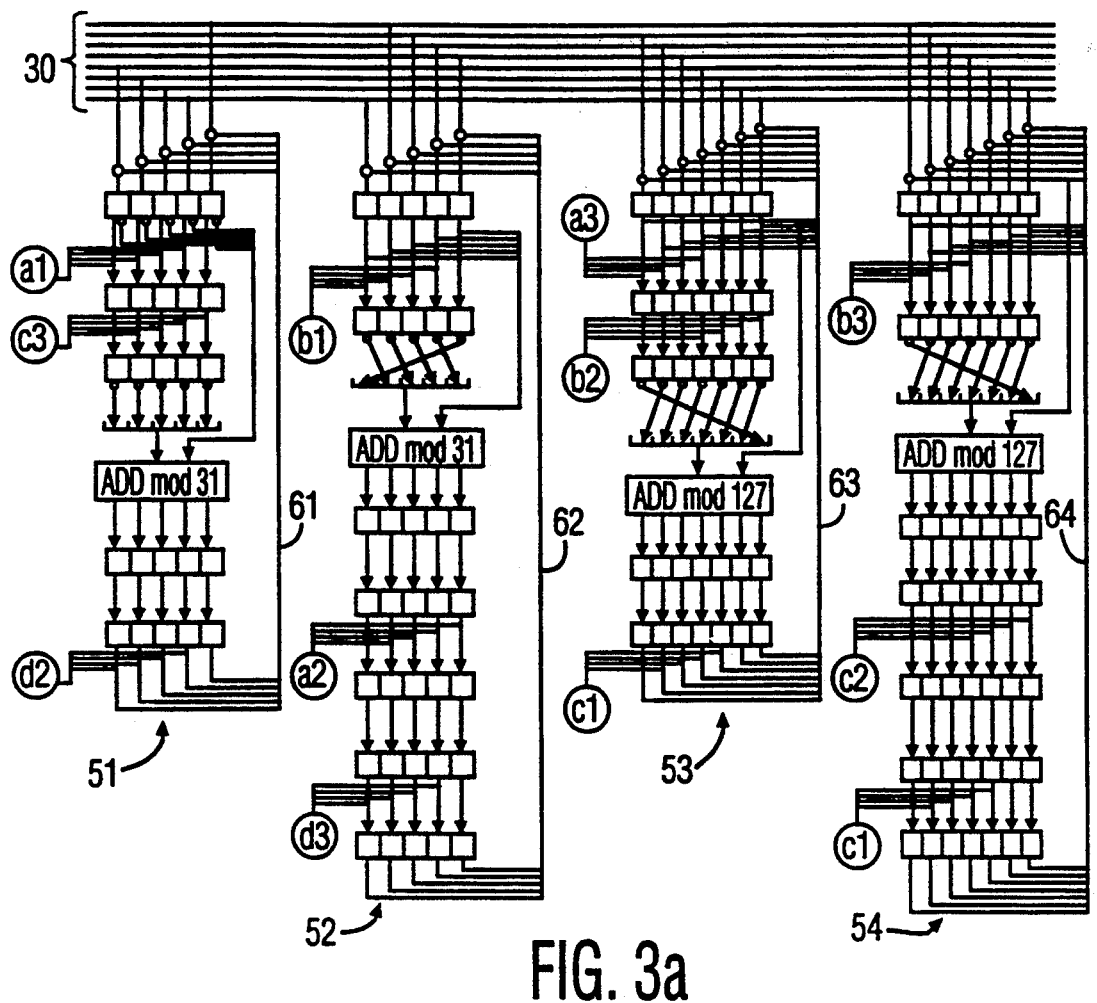
FIG. 3 shows diagrammatically a further scrambling or descrambling device for which the invention can be used.
Figure 3B:
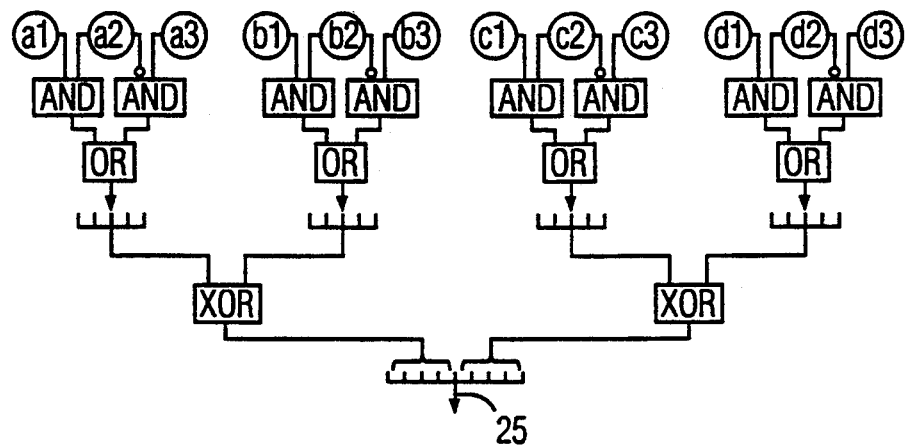

The device, whose diagram is shown in FIG. 3, has also been proposed for scrambling television signals.

This device is a pseudo-random sequence generator which comprises four shift registers 51, 52, 53, 54. Each of these registers is fed back to itself by a connection 61, 62, 63, 64, respectively. An important difference with the generator of FIG. 1 is that in this case the registers are provided for words rather than for bits, in other words, they operate on several parallel bits and the connections 61 to 64 are of the multiwire type. The registers are re-initialized at the start of each data packet: the first stage of each register is charged by means of bits of an initialization word supplied by a bus 30, and the other stages are reset to zero. During their progression in the registers, the words are altered by various measures, for example, the insertion of logic adders "ADD mod 31", "ADD mod 127", the inversion of bits of a word, the insertion of bits from several stages upstream, notably at the output of the third stage of register 51, at the output of the second stage of register 52, of the third stage of register 53, or of the second stage of register 54. Words derived at a1, a2 . . . d2, d3 are applied to the inputs of other adders AND which precede adders OR and XOR eventually supplying a sequence of pseudo-random words 25. The same reference numeral 25 as in FIG. 1 is chosen so as to indicate that the connection conveying these sequences has a similar function in the two assemblies. Other details of the assembly will be known to those skilled in the art and are only shown by way of example. The sequence 25 is used for the signal to be scrambled or descrambled by means of the circuits whose interconnection is identical to that of the circuits 16, 17, 14 of the assembly of FIG. 1 and for this reason they are not shown again. Each of the circuits in question now treats a complete word rather than a single bit and consequently a gate 16 or 17 will be an assembly of N gates, N being the number of parallel bits. Similarly, the signal to be delayed is now taken in the form of successive words and no longer bit by bit. As compared with that of FIG. 1, such an assembly has the advantage that it operates much more rapidly because of the parallel treatment.

Figure 4:
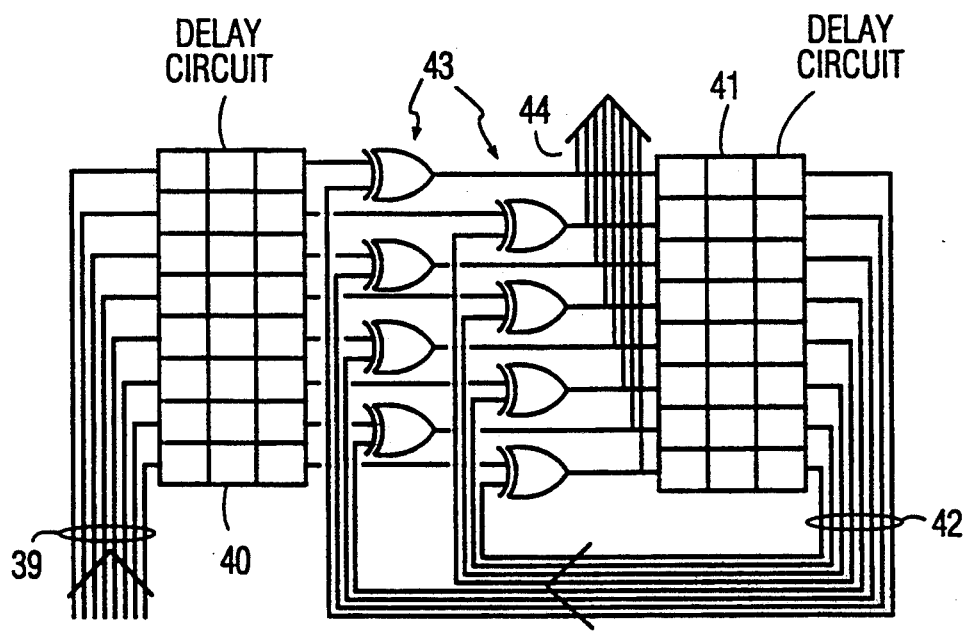
FIG. 4 shows an embodiment of the delay circuit with the EXCLUSIVE-OR gate for use with the device of FIG. 3.

The digital signal is derived, delayed and modified as indicated in FIG. 4. After having derived a word of eight bits in the signal by means of a connection 39, this word is delayed by means of a delay circuit which is a shift register 40 (here with three positions, which provides a delay of three clock periods) of eight parallel bits controlled by the clock of the system, and this word is modified by applying each of its bits to an input of one of the gates of an assembly of EXCLUSIVE-OR gates 43 whose outputs are connected to a second delay circuit 41 which is a register identical to the register 40 of which each output bit is applied via a multiwire connection 42 to a second input of one of the gates of the assembly of gates 43. As in the circuit of FIG. 2, the signal from the gates 43, derived by a connection 44 (here with eight conductors) is used for modifying the pseudo-random sequence in the non-recursive part of the arrangement of FIG. 3, for example one of the points indicated ∫a1", "a2" etc. by means of, for example eight EXCLUSIVE-OR gates.

It should be noted that the insertion of a word of the delayed and modified signal may also be realised in different manners: a word may be altered in a connection either by multiplying it by a word of the delayed signal or by adding a word of the delayed signal thereto, or by replacing it by a word of the delayed signal, or by using the latter word for controlling the inversions of the connections etc. It is obvious that there is a very large number of possible modifications.

The operation is similar to that of the assembly shown in FIG. 2 and the reasoning showing how the errors cease to propagate also applies in this case.

It will be evident that the above descriptions have been given by way of example and that the invention can also be used if the pseudo-random generator is of a type differing from that of the two embodiments described hereinbefore. The invention may also be used, for example for a pseudo-random generator as described in the Specification FR-2 641 921 in the name of the Applicant, by using the signal from the delay circuit in one of the elements denoted by the reference numeral 30 or 32 in the sole FIGURE of this document to which reference is made for more details. Generally, any non-recursive generator may be used for the assembly according to the invention in which it is transformed to a semi-recursive generator.

Figure 5:
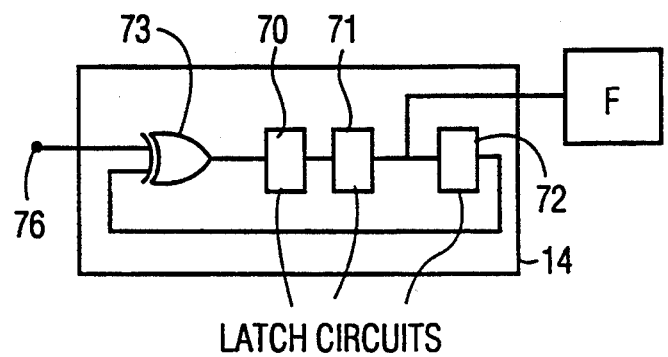
FIG. 5 shows a further embodiment of the delay circuit with the EXCLUSIVE-OR gate, in the case of the element 14 of the device shown in FIG. 1.

The circuit shown in FIG. 2 is intended to make it easily understood how the arrangement operates, but in practice the scheme normally used is slightly different, on the one hand because it is possible to simplify that of FIG. 2 by using a single delay element, on the other hand because it may be necessary to take a possible delay in the elements 12, 14 and particularly in the multiplexer 4 into account, which delay has the effect that the bit of the pseudo-random sequence which is eventually modified by the bit of the rank N from the element 14 (i.e. from the gate 23 in FIG. 2) after a delay of three clock periods is no longer the bit N+3 but, for example the bit N+4 or the bit N+5, dependent on whether the total delay brought about by the elements 12, 14, 4 covers one or two clock periods, respectively. It is even imaginable that the element 20 of FIG. 2 will be redundant if these elements bring about a sufficient delay. FIG. 5 shows an assembly which can be used in practice when the total delay brought about by the elements 12, 14, 4 covers one clock period and when the desired delay for the derived digital signal covers three clock periods. The delay element is now a unique element and it is arranged downstream of the EXCLUSIVE-OR gate now being denoted by the reference numeral 73. A first input 76 of this gate is connected to the connection (18 or 19 as the case may be, FIG. 1) conveying the digital signal, and the output of this EXCLUSIVE-OR gate 73 is connected to the second input via a delay circuit which is constituted by three latch circuits 70, 71, 72. An intermediate terminal in this delay circuit, between the circuits 71 and 72, is connected to the circuit F, i.e. the circuit 12 of FIG. 1. The delay between said intermediate terminal and the second input of the gate, i.e. here covering one clock period in the circuit 72, is equal to the transit time in the pseudo-random sequence generator, i.e. the time required for the signal supplied from said terminal of the element 12 and thus applied to the multiplexer 4 to have a retroactive effect on the digital signal at the level of the gate 17.

It should be noted that the circuit of FIG. 4 may easily be extrapolated on the basis of that shown in FIG. 5, if the arrangement of FIG. 3 is used.

We claim:

1. A method of dynamically modifying a pseudo-random sequence produced by a pseudo-random sequence generator, which sequence is used for scrambling or descrambling information components at least one part of which is provided in the form of a digital signal divided into packets, the scrambling or descrambling being obtained by combining said pseudo-random sequence with said digital signal, said pseudo-random sequence generator being re-initialized at each start of the packet by means of an initialization word, wherein said digital signal is derived, delayed and combined with a series of bits present in the pseudo-random sequence generator for modifying said series of bits and in that the derived digital signal is modified by submitting it to a logic operation of the "EXCLUSIVE-OR" type before it is combined with a series of bits present in the pseudo-random sequence generator, one of the operands being the signal itself and the other operand being the signal which emanates from said operation and is delayed by a time which is equal to the shift between the instant when the digital signal is derived and the instant when its combination with a series of bits present in the pseudo-random sequence generator has a retroactive effect on the digital signal.

2. A method as claimed in claim 1, wherein said signal is derived at a point where it is not yet combined with the pseudo-random sequence when the operation to be performed is a scrambling operation, and said signal is derived at a point where it is combined with the pseudo-random sequence when the operation to be performed is a descrambling operation.

3. A method as claimed in claim 1 wherein the combination of the delayed signal with the series of bits present in the pseudo-random sequence generator is started for each new packet only after a certain delay since the start of the packet.

4. A method as claimed in claim 3, wherein said delay is determined from the first bits of the packet.

5. A method as claimed in claim 3, wherein said delay is determined from the bits of the initialization word.

6. A device for scrambling or descrambling information components at least one part of which is transmitted in the form of a digital signal divided into packets, which device comprises a pseudo-random sequence generator which is re-initialized at each start of the packet, a first non-recursive combination means for forming a pseudo-random sequence on the basis of a series of bits present in the pseudo-random sequence generator, a second combination means for combining the pseudo-random sequence with the digital signal to be scrambled or descrambled, wherein for modifying the pseudo-random sequence the device also comprises a delay circuit whose input is connected to a connection conveying the digital signal and whose output is connected to said first combination means of the pseudo-random generator in such a way that it modifies said series of bits, and an "EXCLUSIVE-OR" gate which is arranged in the delay circuit between said connection conveying the digital signal and said first combination means and whose output is fed back to its input via a delay means having a delay which is equal to the shift between the instant when the digital signal is derived and the instant when its combination with a series of bits present in the pseudo-random sequence generator has a retroactive effect on the digital signal.

7. A device as claimed in claim 6, wherein the EXCLUSIVE-OR gate has at least a first and a second input, the first input of said EXCLUSIVE-OR gate being connected to the digital signal connection, the output being connected to the second input via a delay circuit and an intermediate terminal in the delay circuit being connected to the first combination means of the pseudo-random generator, the delay between said terminal and the second input of the gate being equal to the transit time in the pseudo-random sequence generator, i.e. the time necessary for the signal from said terminal to the first combination means of the pseudo-random generator to have a retroactive effect on the digital signal.

8. A device as claimed in claim 6, intended for scrambling, in which a bit of said pseudo-random sequence is applied to a first input of the second combination means and a bit of the digital signal to be scrambled is applied to a second input of said means in such a way that a scrambled digital signal is supplied at the output of said means, wherein said delay circuit is connected to said second input of said means.

9. A device as claimed in claim 6, intended for descrambling, in which a bit of said pseudo-random sequence is applied to a first input of the second combination means and a bit of the digital signal to be descrambled is applied to a second input of said means in such a way that a descrambled digital signal is supplied at the output of said means, wherein said delay circuit is connected to the output of said means.

* * * * *